(12) United States Patent
Benedetti

(10) Patent No.: US 11,685,565 B2
(45) Date of Patent: Jun. 27, 2023

(54) MACHINE FOR FILLING CONTAINERS WITH FRUIT OR VEGETABLE PRODUCTS

(71) Applicant: UNITEC S.P.A., Lugo (IT)

(72) Inventor: Luca Benedetti, Savarna (IT)

( * ) Notice: Subject to any disclaimer, the term of this patent is extended or adjusted under 35 U.S.C. 154(b) by 615 days.

(21) Appl. No.: 15/319,911

(22) PCT Filed: Jun. 17, 2015

(86) PCT No.: PCT/IB2015/054563
§ 371 (c)(1),
(2) Date: Dec. 19, 2016

(87) PCT Pub. No.: WO2015/193823
PCT Pub. Date: Dec. 23, 2015

(65) Prior Publication Data
US 2017/0121042 A1 May 4, 2017

(30) Foreign Application Priority Data
Jun. 21, 2014 (EP) .................................. EP14173365

(51) Int. Cl.
*B65B 1/32* (2006.01)
*B65B 25/04* (2006.01)
(Continued)

(52) U.S. Cl.
CPC .............. *B65B 25/046* (2013.01); *B65B 1/32* (2013.01); *B65B 25/04* (2013.01); *B65B 35/243* (2013.01);
(Continued)

(58) Field of Classification Search
CPC ......... B65B 25/046; B65B 1/32; B65B 25/04; B65B 35/243; B65B 35/246; B65B 35/44;
(Continued)

(56) References Cited

U.S. PATENT DOCUMENTS 2,746,707 A * 5/1956 Petrea ..................... G01G 13/00
177/52
3,416,619 A * 12/1968 McClusky ................ B65B 1/34
177/53
(Continued)

FOREIGN PATENT DOCUMENTS

EP 0584425 A1 3/1994
EP 0787653 A1 6/1997
(Continued)

OTHER PUBLICATIONS

International Search Report of the EPO dated Aug. 18, 2015.

*Primary Examiner* — Thomas M Wittenschlaeger
*Assistant Examiner* — David G Shutty
(74) *Attorney, Agent, or Firm* — Themis Law

(57) ABSTRACT

A filling machine for filling containers with fruit or vegetables products includes a transportation system for step-by-step conveying the containers to be filled along a horizontal predetermined direction; a primary plain belt conveyor system for products fed parallel to the horizontal direction and adapted to generate a main bulk filling of the containers; a secondary belt conveyor system for single products fed parallel to the horizontal direction and adapted to cooperate simultaneously with the primary belt conveyor system so as to complete the entire final filling of the containers; a motion system applied to both the principal and the secondary belt conveyor systems for a reciprocating motion of the primary and secondary belt conveyor systems in a direction parallel to the horizontal direction; and at least one weighing station for constant weighing the containers during filling.

8 Claims, 3 Drawing Sheets

(51) Int. Cl.
| | |
|---|---|
| *B65B 35/24* | (2006.01) |
| *B65B 35/44* | (2006.01) |
| *B65B 35/54* | (2006.01) |
| *B65B 57/16* | (2006.01) |
| *B65B 59/00* | (2006.01) |
| *B65G 15/00* | (2006.01) |
| *B65G 15/12* | (2006.01) |
| *B65G 19/02* | (2006.01) |

(52) U.S. Cl.
CPC ............ *B65B 35/246* (2013.01); *B65B 35/44* (2013.01); *B65B 35/54* (2013.01); *B65B 57/16* (2013.01); *B65B 59/003* (2019.05); *B65B 59/005* (2013.01); *B65G 15/00* (2013.01); *B65G 15/12* (2013.01); *B65G 19/02* (2013.01)

(58) Field of Classification Search
CPC ....... B65B 35/54; B65B 57/16; B65B 59/005; B65B 1/06; B65B 1/34; B65B 35/24; B65B 37/005; B65G 15/00; B65G 15/12; B65G 19/02
USPC .................. 53/237, 240, 244, 250, 251, 502
See application file for complete search history.

(56) References Cited

U.S. PATENT DOCUMENTS

| | | | | |
|---|---|---|---|---|
| 3,627,101 | A * | 12/1971 | McClusky | B65B 35/44 198/440 |
| 4,537,006 | A * | 8/1985 | Pieri | B65C 7/00 53/134.1 |
| 4,600,065 | A * | 7/1986 | Morris | G01G 13/241 141/128 |
| 4,747,480 | A * | 5/1988 | Wedler | B65G 47/2445 198/396 |
| 5,072,100 | A * | 12/1991 | McClusky | B65B 25/046 235/98 R |
| 5,325,653 | A * | 7/1994 | Boyd | B65B 25/046 141/128 |
| 6,252,181 | B1 * | 6/2001 | Fallas | G01G 15/00 177/119 |
| 6,354,231 | B1 * | 3/2002 | Morris | A47B 91/028 108/144.11 |
| 7,311,191 | B2 * | 12/2007 | Bahr | B65G 47/2445 198/396 |
| 7,531,758 | B2 * | 5/2009 | Grove | G01G 11/003 177/119 |
| 7,793,773 | B2 * | 9/2010 | Beck | B65G 47/2445 198/584 |
| 8,061,503 | B2 * | 11/2011 | Ancarani | B65G 47/2445 198/398 |
| 8,776,986 | B2 * | 7/2014 | Morley | B65G 47/31 198/461.1 |
| 2008/0066429 | A1 | 3/2008 | De Greef | |
| 2012/0073480 | A1 * | 3/2012 | Korb | F16B 12/20 108/147.18 |
| 2014/0190123 | A1 * | 7/2014 | Benedetti | B65B 25/046 53/390 |
| 2015/0239679 | A1 * | 8/2015 | Magnusson | B65G 47/682 198/454 |
| 2015/0353212 | A1 * | 12/2015 | Williamson | B65B 59/005 53/502 |
| 2017/0121042 | A1 * | 5/2017 | Benedetti | B65B 25/04 |

FOREIGN PATENT DOCUMENTS

| | | | | |
|---|---|---|---|---|
| EP | 0787653 | A1 * | 8/1997 | ........... G01G 19/393 |
| EP | 1327585 | A1 | 7/2003 | |
| JP | S5220461 | U | 2/1977 | |
| JP | S6034309 | A | 2/1985 | |
| JP | H046017 | A | 10/1992 | |
| JP | 2002037204 | A | 2/2002 | |
| WO | WO-2013041464 | A1 * | 3/2001 | ........... B65B 25/046 |
| WO | WO-2013041464 | A1 * | 3/2013 | ........... B65B 25/046 |

\* cited by examiner

MACHINE FOR FILLING CONTAINERS WITH FRUIT OR VEGETABLE PRODUCTS

FIELD OF THE INVENTION

The present invention relates to a machine for the automated packaging of fruit or vegetable products.

In particular, the invention finds advantageous exploitation in the automated filling of containers, such as trays, cases, boxes or equivalents, with cherries or similar small fruits, to which the following description will make explicit reference without thereby losing generality.

SUMMARY OF THE INVENTION

The main object of the invention is the achievement, without any intervention of the staff, of the accurate and delicate filling of products inside the containers.

Another object of the present invention is to realize an effective, precise, constant and optimal control of the weight of containers during all the filling steps.

BRIEF DESCRIPTION OF THE DRAWINGS

The structural and natural characteristics of the present invention and its advantages referring to the known technique will be even clearer and evident by the underlying claims, and in particular by an exam of the following description, referring to the annexed drawings, which show the outlines of a preferred but not limitative embodiment of a filling machine, in which:

DETAILED DESCRIPTION

Figure 1:
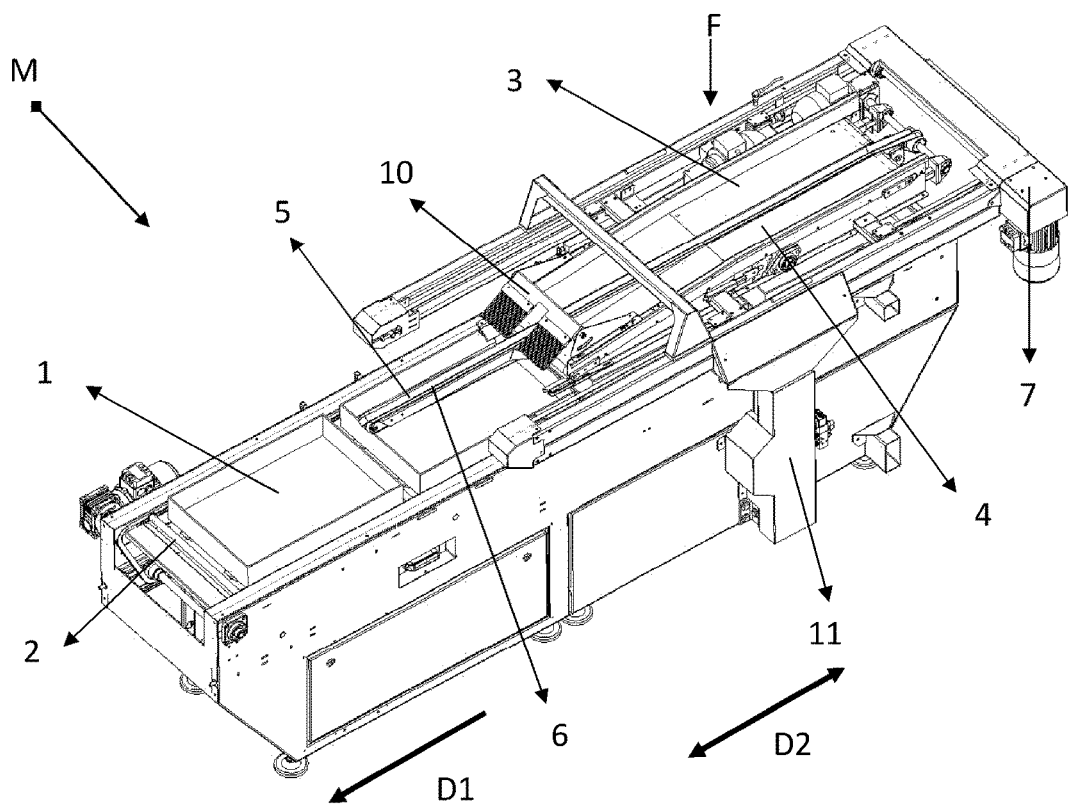
FIG. 1 shows a perspective view of a preferred embodiment of a filling machine according to the present invention.
Figure 2:
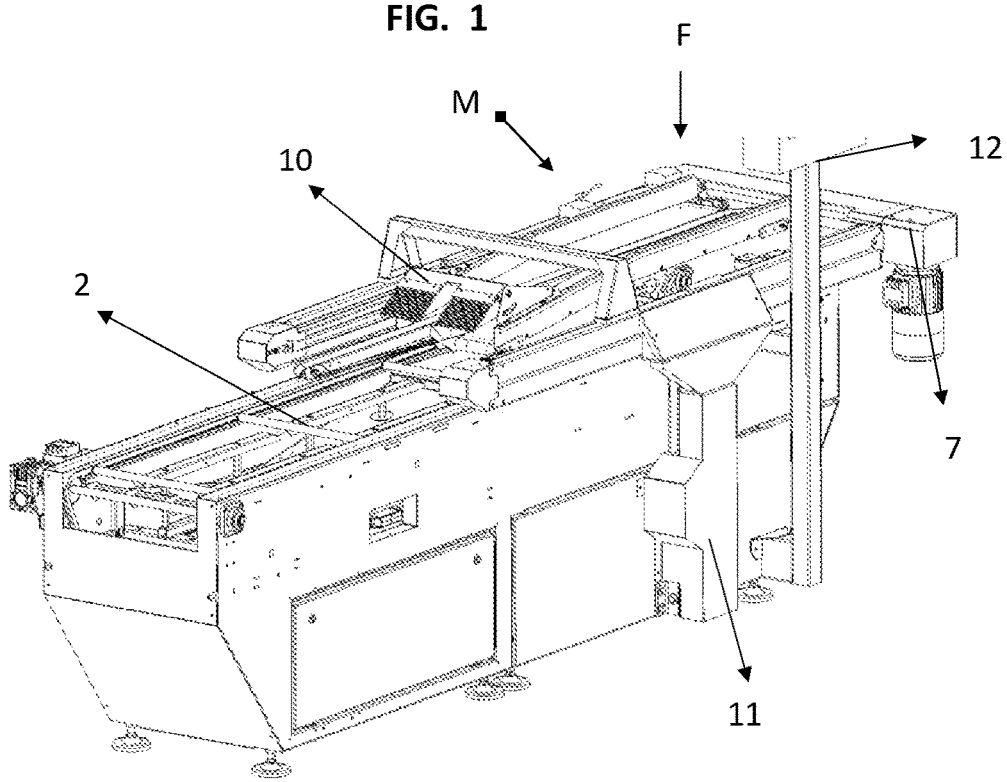
FIG. 2 shows another perspective view of the filling machine of FIG. 1.
Figure 3:
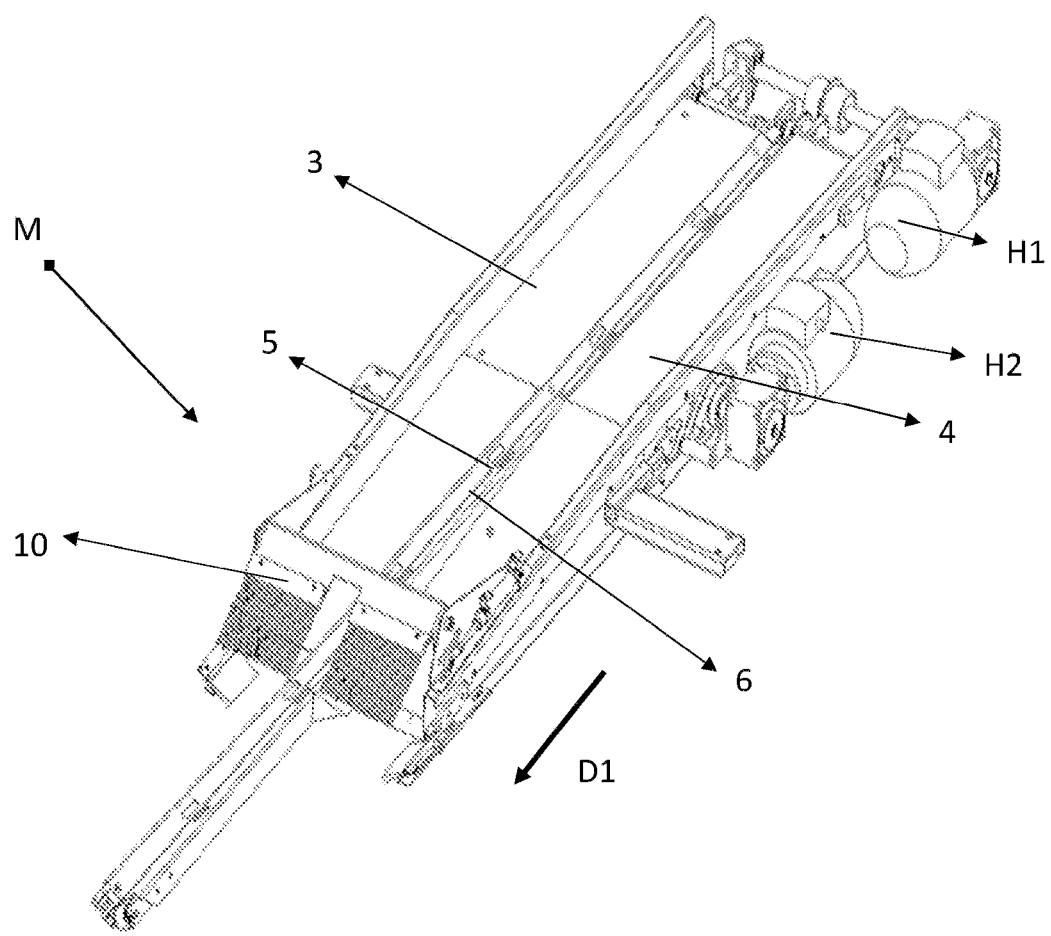
FIG. 3 shows a perspective view on an enlarged scale of an operative component the filling machine according to FIGS. 1 and 2.
Figure 3A:
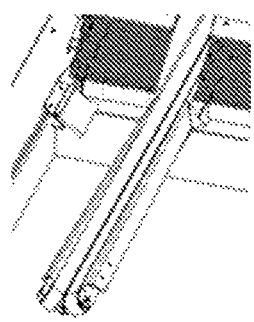
FIG. 3A shows an enlarged view of a detail of the secondary belt conveyors depicted in FIGS. 3 and 4.
Figure 4:
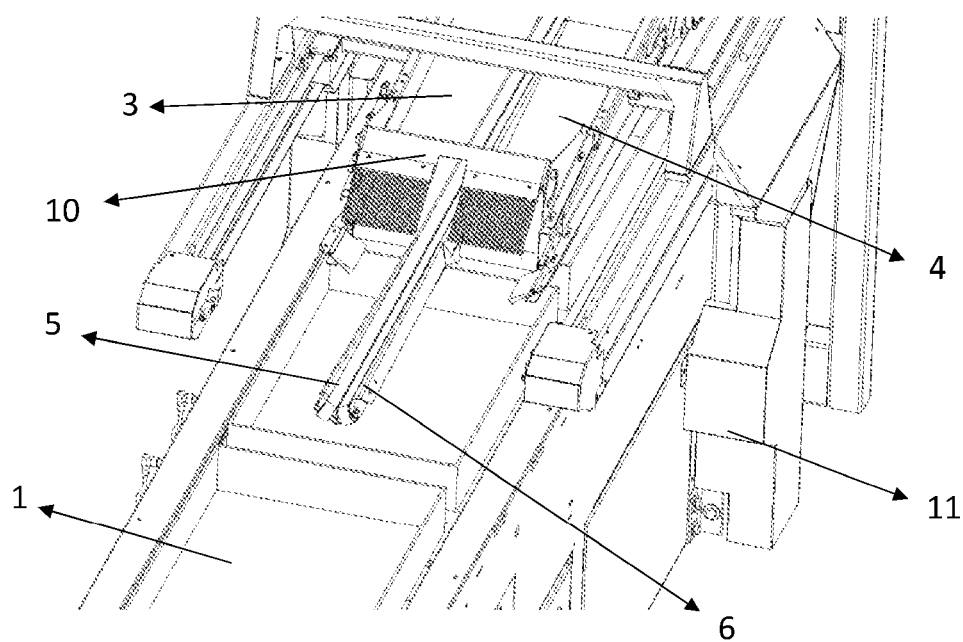
FIG. 4 shows a partial view on a further enlarged scale of the component of FIG. 3.
Figure 5:
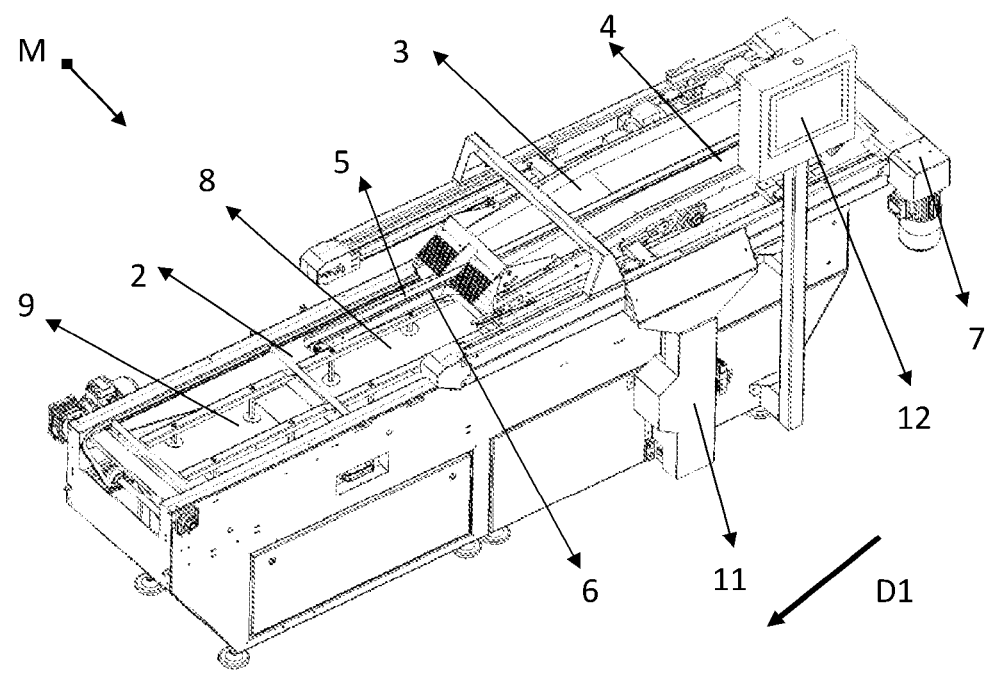
FIG. 5 is another perspective view showing further details of the filling machine of FIGS. 1 and 2.

With reference to the accompanying FIGS. 1 to 5, a filling machine M for filling containers 1, such as trays, cases, boxes or equivalents, with products like cherries or similar small fruits (not shown) is globally indicated.

Machine M comprises a frame F adapted to support structural operating components globally defined by:

transportation means 2 for the step-by-step conveying the containers 1 to be filled along a horizontal determined direction D1;

two identical primary plain belt conveyors 3 and 4, arranged coupled and parallel to each other, with a single motor H1 and suitably spaced from each other, adapted to receive the products by external supply means (not shown), said belt conveyors 3 and 4 having the purpose of the products feeding parallel to said horizontal direction D1 inside the containers 1 so as to realize the main bulk filling of the containers 1;

two identical secondary small belt conveyors 5 and 6 and arranged by each other in way that to form a substantially V-shaped conveyor (see FIGS. 3 and 4) and with a single motor H2, said secondary belt conveyors 5 and 6 being adjacent and centrally located above and between the two primary belt conveyors 3 and 4, and being adapted to receive the products by external supply means (not shown); each belt conveyor 5, 6 having a transverse dimension (with respect to said horizontal direction D1) smaller than the transverse dimension of each primary belt conveyor 3, 4. The secondary belt conveyors 5 and 6 are adapted to cooperate simultaneously with the primary belt conveyor means 3 and 4 for the purpose of a small filling of singles products inside the containers 1 so as to realize a fine final filling and to complete the whole filling of the containers 1;

motion means 7 applied to both principal 3 and 4 and secondary 5 and 6 belt conveyors for reciprocating moving "in translation" said aforementioned principal 3 and 4 and secondary 5 and 6 belt conveyors in a direction D2 parallel to the horizontal direction D1;

two subsequent first 8 and second 9 weighing stations (see FIG. 5) for constant and effective weighing the containers 1 during the aforementioned fillings and arranged under and along the transport path of the containers 1 on transportation means 2;

a stop barrier-type device 10 for stopping the feeding of the products lying on said primary main belt conveyor 3 and 4, so as to allow changing the format and size of the containers 1 in correspondence of the first weighing station 8 without let the products fall down from said principal conveyor belts 3 and 4;

means 11 for height adjustment (i.e. transversal to said horizontal direction D1) of both the primary 3 and 4 and the secondary 5 and 6 belt conveyors to allow to the filling machine M to use different sizes and formats of containers 1 to be filled with the products;

control and display means 12 (i.e. software, display, touch screen etc.) for controlling the overall operations of the machine M and also in order to carry out the filling up to forty models of containers 1 of different sizes both in height and in length.

The operation steps of the machine M of the invention is the following.

The products are fed to the principal 3 and 4 and to secondary 5 and 6 belt conveyors, and the transportation means 2 move the containers 1 below said primary and secondary conveyors, therefore the main and greater bulk filling of products into the containers 1 is realized through the cited principal belt conveyors 3 and 4 and it's then achieved a first weight control at the first weighing station 8.

In correspondence of the second weighing station 9 is subsequently realized a final precise filling of singles products into the containers 1 through the secondary internal V-shaped belt conveyors 5 and 6 acting simultaneously with the primary conveyors in order to achieve a complete final filling of the containers 1 reaching a final prefixed weighing value.

Advantages of the machine M described above with respect to the known devices are: increased production speed and therefore greater potential, increased sensitivity and precision of filling process with optimal and delicate treatment of the products without any damage, improved accuracy of weighing and increased versatility.

The invention claimed is:

1. A filling machine for filling containers with fruit or vegetable products, comprising:
   a first primary belt conveyor and a second primary belt conveyor disposed parallel to one another, the first primary belt conveyor and the second primary belt conveyor being arranged to receive the fruit or vegetable products at a first end and deliver a first amount of the fruit or vegetable products to a container provided at a first weighing station disposed adjacently to a second end of the first primary belt conveyor and the second primary belt conveyor; and a first secondary belt conveyor and a second secondary belt conveyor disposed at an angle in relation to one another so as to define a cavity therebetween, the first secondary belt conveyor and the second secondary belt conveyor being disposed above and along a longitudinal direction parallel to a longitudinal direction of the first primary belt conveyor and the second primary belt conveyor, between the first primary belt conveyor and the second primary belt conveyor, and angularly in relation to the first primary belt conveyor and the second primary belt conveyor, the first secondary belt conveyor and the second secondary belt conveyor extending beyond the second end of the first primary belt conveyor and the second primary belt conveyor so as to deliver a second amount of the fruit or vegetable products to the container provided at a second weighing station and to achieve a predetermined weight of the fruit or vegetable products in the container, the filling machine causing the container to move from the first weighing station to the second weighing station in a direction parallel to directions of movement of the first primary belt conveyor and the second primary belt conveyor and of the first secondary belt conveyor and the second secondary belt conveyor.

2. The filling machine of claim 1, wherein the first secondary belt conveyor and the second secondary belt conveyor are positioned between the first primary belt conveyor and the second primary belt conveyor.

3. The filling machine of claim 1, wherein the first primary belt conveyor and the second primary belt conveyor are actuated by a first common motor, and the first secondary belt conveyor and the second secondary belt conveyor are actuated by a second common motor.

4. The filling machine of claim 1, wherein each of the first secondary belt conveyor and the second secondary belt conveyor has a cross-section smaller than each of the first primary belt conveyor and the second primary belt conveyor.

5. The filling machine of claim 1, wherein the cavity defined by the first secondary belt conveyor and the second secondary belt conveyor is dimensioned to carry only single ones of the fruit or vegetable products along a length of the cavity.

6. The filling machine of claim 1, further comprising a barrier disposed transversely to the first second primary belt conveyor and the second primary belt conveyor, the barrier being adapted to stop a feeding of the fruit or vegetable products into the container.

7. The filling machine of claim 1, wherein the first second primary belt conveyor and the second primary belt conveyor, and the first second secondary belt conveyor and the second secondary belt conveyor, are adjustable in height so as to accommodate different container sizes.

8. The filling machine of claim 1, further comprising a control and display device adapted to control operation of the filling machine and set the filling machine up for containers of different heights and lengths.

* * * * *